United States Patent
Mittal et al.

(10) Patent No.: US 7,035,212 B1
(45) Date of Patent: Apr. 25, 2006

(54) METHOD AND APPARATUS FOR END TO END FORWARDING ARCHITECTURE

(75) Inventors: Millind Mittal, Palo Alto, CA (US); Laxman Shankar, San Jose, CA (US)

(73) Assignee: Optim Networks, Sunnyvale, CA (US)

( * ) Notice: Subject to any disclaimer, the term of this patent is extended or adjusted under 35 U.S.C. 154(b) by 777 days.

(21) Appl. No.: 09/770,832

(22) Filed: Jan. 25, 2001

(51) Int. Cl.
*H04L 12/28* (2006.01)

(52) U.S. Cl. .................. 370/230; 370/413; 711/202

(58) Field of Classification Search ............... 370/229, 370/230, 351, 389, 392, 395.1, 395.3, 412, 370/413, 428, 432, 470, 471, 474; 709/217, 709/236, 245; 711/118, 202
See application file for complete search history.

(56) References Cited

U.S. PATENT DOCUMENTS

| | | | |
|---|---|---|---|
| 6,259,699 B1 * | 7/2001 | Opalka et al. ............... | 370/398 |
| 6,574,232 B1 * | 6/2003 | Honig et al. ................. | 370/413 |
| 6,584,106 B1 * | 6/2003 | Merchant et al. ...... | 370/395.32 |
| 6,738,352 B1 * | 5/2004 | Yamada et al. ............. | 370/238 |
| 6,831,893 B1 * | 12/2004 | Ben Nun et al. ........... | 370/235 |
| 6,876,668 B1 * | 4/2005 | Chawla et al. .............. | 370/468 |

OTHER PUBLICATIONS

*CSIX-L1: Common Switch Interface Specification—L1*, Copyright 2000, pages i through 63.

* cited by examiner

*Primary Examiner*—Wellington Chin
*Assistant Examiner*—John Shew
(74) *Attorney, Agent, or Firm*—Marger Johnson & McCollom, P.C.

(57) ABSTRACT

An end to end forwarding architecture includes a memory hub having a first ingress interface for receiving packets from a source port. The packets have associated ingress flow identifiers. A second ingress interface outputs the packets to a switch fabric. An ingress controller manages how the packets are queued and output to the switch fabric. The same memory hub can be used for both per flow queuing and per Class of Service (CoS) queuing. A similar structure is used on the egress side of the switch fabric. The end to end forwarding architecture separates per flow traffic scheduling operations performed in a traffic manager from the per flow packet storage operations performed by the memory hub.

53 Claims, 12 Drawing Sheets

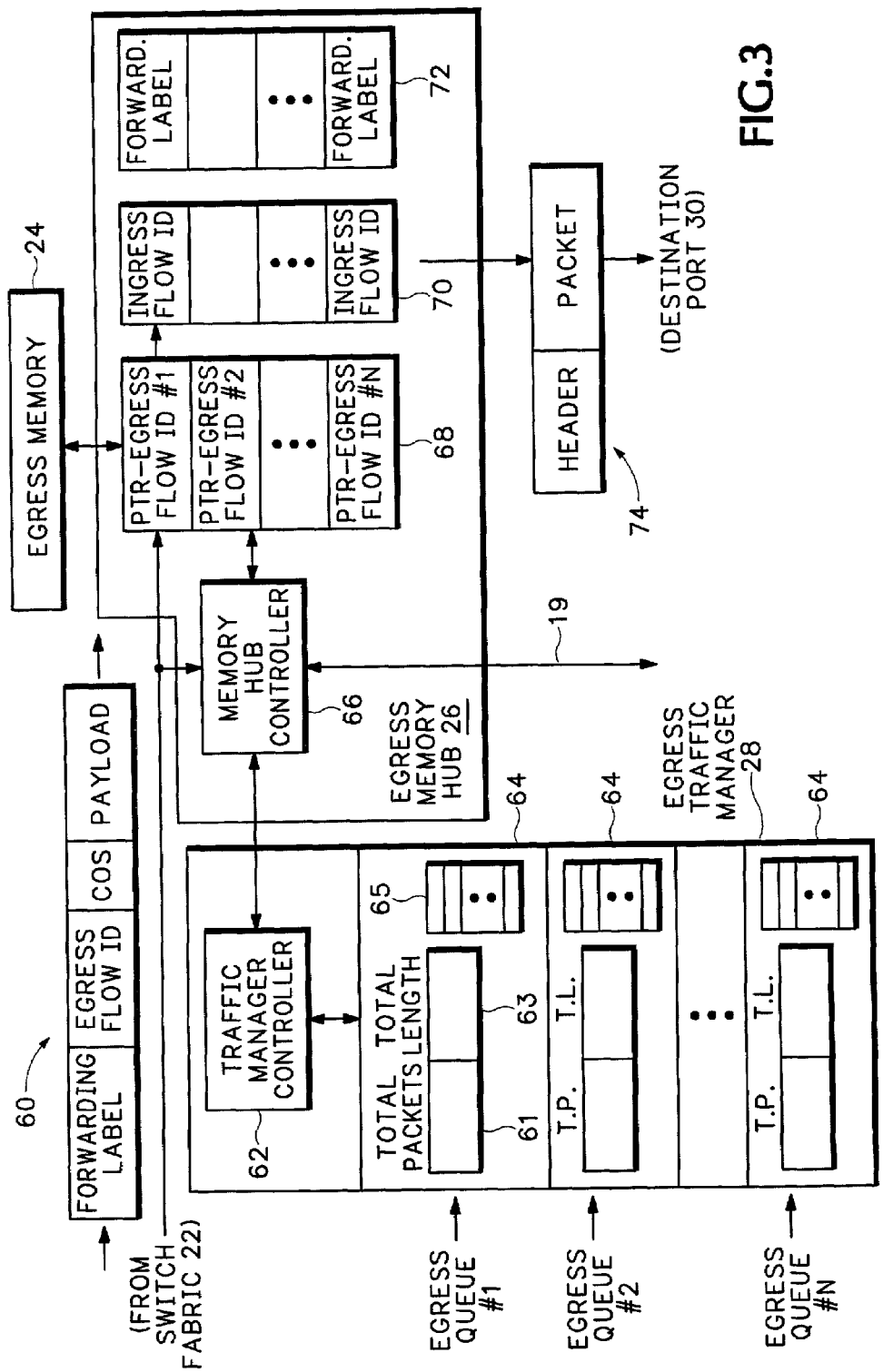

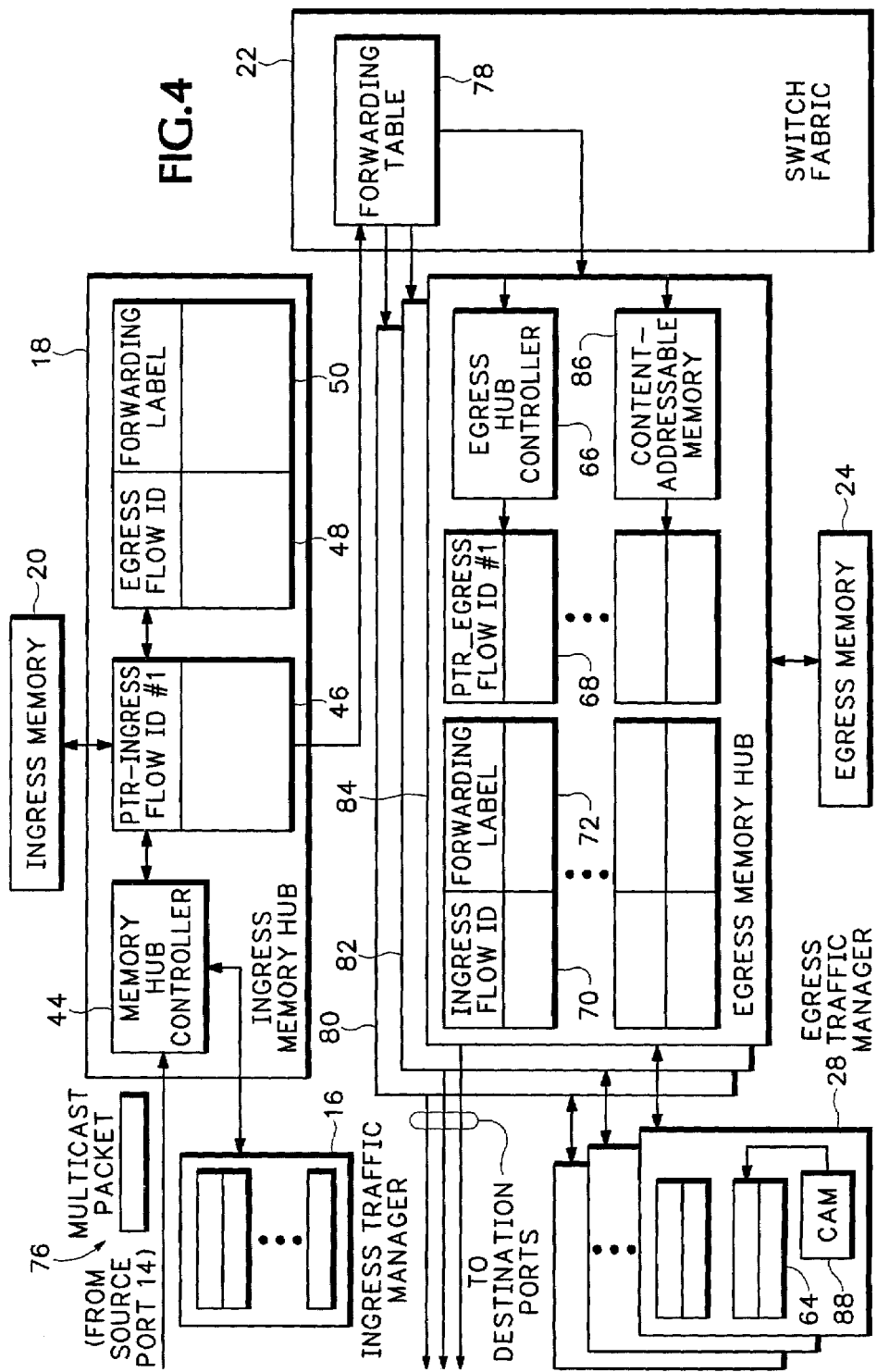

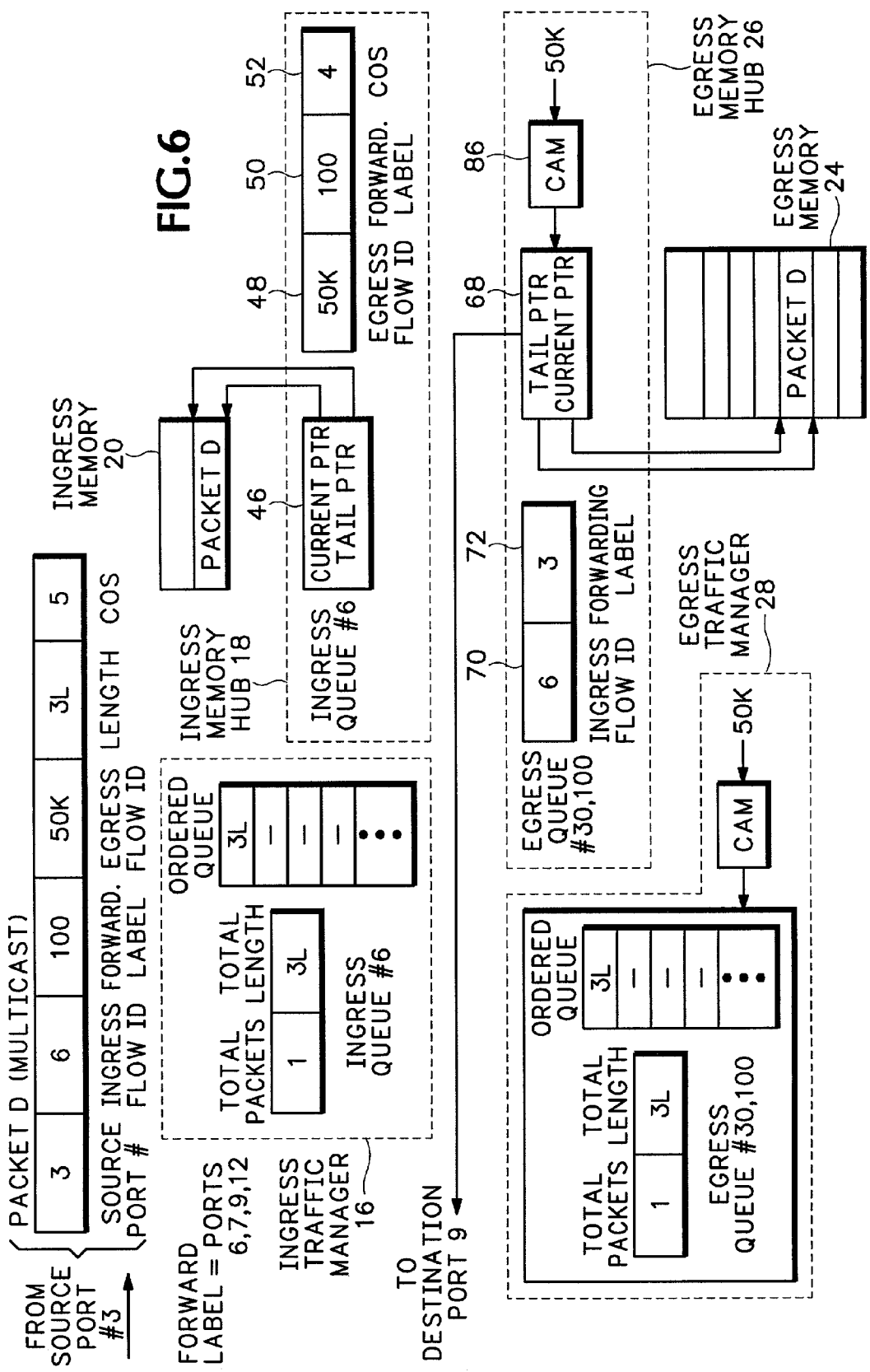

_METHOD AND APPARATUS FOR END TO END FORWARDING ARCHITECTURE_

BACKGROUND

Current network processing architectures, such as used with network routers and network switches, include multiple line cards that receive packets from different input ports. On the ingress side of a switch fabric, a traffic manager receives the packets and queues the packets for sending to the switch fabric based on some quality of service criteria. The packets are queued by the traffic manager for outputting to a backplane interface that then forwards the packets to the switch fabric. The backplane interface provides an interface between the traffic manager and the switch fabric that queues the ingress flows according to their identified destination ports.

The switch fabric establishes paths for forwarding the packets to output ports according to destination information attached to the packet headers. On the egress side of the switch fabric, the traffic manager processes the packets on a per flow basis from the different line cards sending packets over the switch fabric. There are multiple ingress flows from different line cards sending packets to the switch fabric at the same time.

Both the traffic manager and a backplane interface have to maintain and manage separate sets of buffers and separate sets of transceivers for communicating with the other processing elements in the network processing device. This requires more hardware while requiring additional time for sending and receiving data and data management commands.

The present invention addresses this and other problems associated with the prior art.

SUMMARY OF THE INVENTION

An end to end forwarding architecture includes a memory hub having a first ingress interface for receiving packets from a source port. The packets have associated ingress flow identifiers. A second ingress interface outputs the packets to a switch fabric. An ingress controller manages how the packets are queued and output to the switch fabric. The same memory hub can be used for both per flow queuing and per Class of Service (CoS) queuing. A similar structure is used on the egress side of the switch fabric. The end to end forwarding architecture separates per flow traffic scheduling operations performed in a traffic manager from the per flow packet storage operations performed by the memory hub.

BRIEF DESCRIPTION OF THE DRAWINGS

FIG. 3 is a detailed block diagram of the egress side of the forwarding architecture shown in FIG. 1.

FIG. 4 is a detailed diagram of the forwarding architecture shown in FIG. 1 showing how multicast packets are processed.

FIG. 6 is a diagram showing one example how multicast packets are queued using the end to end forwarding architecture.

DETAILED DESCRIPTION

Figure 1A:
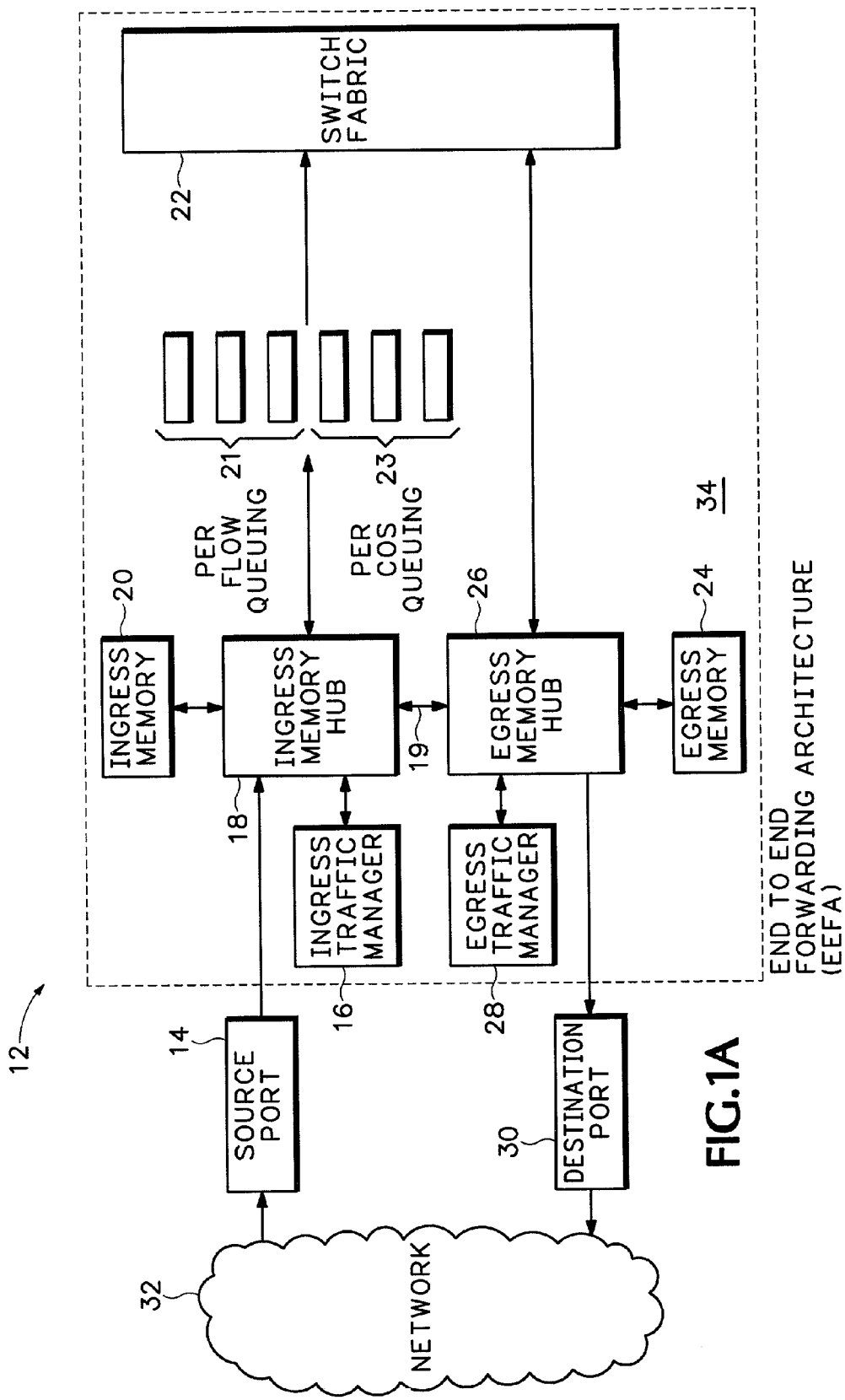
FIG. 1A is a block diagram of a first embodiment of an end to end forwarding architecture.

FIG. 1A shows a network processing device 12, such as may be used with concentrators, network gateways, Internet backbone routers, switches, etc. One of multiple source ports 14 receives packets from a network 32, such as a Local Area Network (LAN), Metropolitan Area Network (MAN) or Wide Area Network (WAN). The source port 14 assigns an ingress flow Id for a stream of packets. The ingress flow Id is inserted into a field in the packet headers. A flow is defined as a packet stream with similar bandwidth/Quality of Service or other similar packet processing requirements.

A switching architecture 34 includes ingress traffic manager 16, ingress memory hub 18, ingress memory 20, egress traffic manager 28, egress memory hub 26, egress memory 24, and switch fabric 22. The ingress memory hub 18 receives packets from the source port 14 through a first interface and stores the packets in ingress memory 20 according to the ingress flow Id in the packet header.

The ingress memory hub 18 updates a pointer in an ingress queue for the particular ingress flow Id associated with the received packet. The ingress memory hub 18 is also aware of an egress flow ID and forwarding label associated with the ingress flow Id. The forwarding label identifies the forwarding path in switch fabric 22 to the destination port where the packet is directed. For multicast packets, the forwarding label identifies the forwarding paths in the switch fabric 22 to multiple destination ports where the packet is directed.

The ingress memory hub 18 sends ingress flow id information, such as an ingress flow Id, packet size, etc. to the ingress traffic manager 16. The ingress traffic manager 16 sends scheduling commands back to the ingress memory hub 18 indicating when packets for different ingress flow Ids are output to the switch fabric 22. In one example, the ingress traffic manager 16 is located on a separate integrated circuit or circuit board than the ingress memory hub 18. However, the ingress traffic manager and the ingress memory hub could also be part of the same circuit. This also applies for the egress memory hub and egress traffic manager. When the memory hub and traffic manager are part of the same circuit, the communication between them may or may not be the same as described below.

When a particular ingress flow Id is scheduled by the ingress traffic manager 16, the ingress memory hub 18 uses the pointers in the associated ingress flow queue to read the next packet (or cell) for the identified ingress flow from ingress memory 20. The ingress memory hub 18 attaches the egress flow Id and forwarding label associated with the ingress flow Id to the header of the outgoing packet. The packet with the egress flow Id and forwarding label is then output to the switch fabric 22.

Packets can be queued for outputting to the switch fabric 22 on a per flow basis, as shown by packets 21. Alternatively, packets can be queued for outputting to the switch fabric 22 on a per Class of Service (CoS) basis, as shown by packets 23. The packets are typically queued by the ingress traffic manager 16 on one of either a per flow basis or a per CoS per destination basis, but not both. However, there may be situations where the ingress traffic manager 16 queues the packets on both a per flow basis and a per CoS basis.

A Class of Service (CoS) value may come with the packet received from source port 14. Alternatively, the CoS value may be associated statically with particular flow Ids that are identified in the memory structure in ingress memory hub 18. When giving scheduling commands to the ingress memory hub 18, the ingress traffic manager 16 can vary the previous CoS value associated with the packet.

Class of Service may identify constant bit rate traffic, such as used with Time Division Multiplexed (TDM) traffic, that has a fixed bandwidth and fixed latency. Another example of Class of Service includes guaranteed bit rate traffic that has a guaranteed bandwidth but may have latency variations.

The egress memory hub 26 receives the packets from the switch fabric 22 and reads the egress flow Id in the packet header. The egress flow Id is used to identify an egress queue in the egress memory hub 26. The egress memory hub 26 stores the packet in egress memory 24. The egress flow information for the packet is relayed to the egress traffic manager 28 that then updates its own egress queue associated with that particular egress flow Id. For example, the egress traffic manager 28 updates the total number of packets, total length of the egress flow Id, an ordered queue that tracks the lengths of the individual packets in the order they are received, and other information that may be associated with that particular egress flow Id.

The egress traffic manager 28 then schedules when packets from egress memory 24 are output to destination port 30. The egress traffic manager 28 tells the egress memory hub 26 when to output a packet for a specified egress flow Id. The egress memory hub 26 reads a packet from egress memory 24 using the pointers in the egress queue for the identified egress flow Id.

The architecture 34 combines traffic management with backplane interfacing for processing packets on a per flow basis. This eliminates one complex packet queuing stage from the overall network processing device as well as eliminating one set of interfaces. The architecture 34 isolates complex memory management required for queuing packets to the ingress and egress memory hubs 18 and 26. By isolating memory operations and memory technology from the ingress and egress traffic managers 16 and 28, the circuitry in the ingress and egress traffic managers 16 and 28 is simplified.

Control lines 19 are used for communications between the ingress memory hub 18 and the egress memory hub 26. For example, the egress memory hub 26 may want the ingress memory hub to inject a flow control packet in the switch fabric 22. The egress memory hub 26 will identify the forwarding label and ingress flow Id for the control packet. The ingress memory hub 18 then injects the identified flow control packet with the forwarding label and ingress flow information into the switch fabric 22.

Figure 1B:
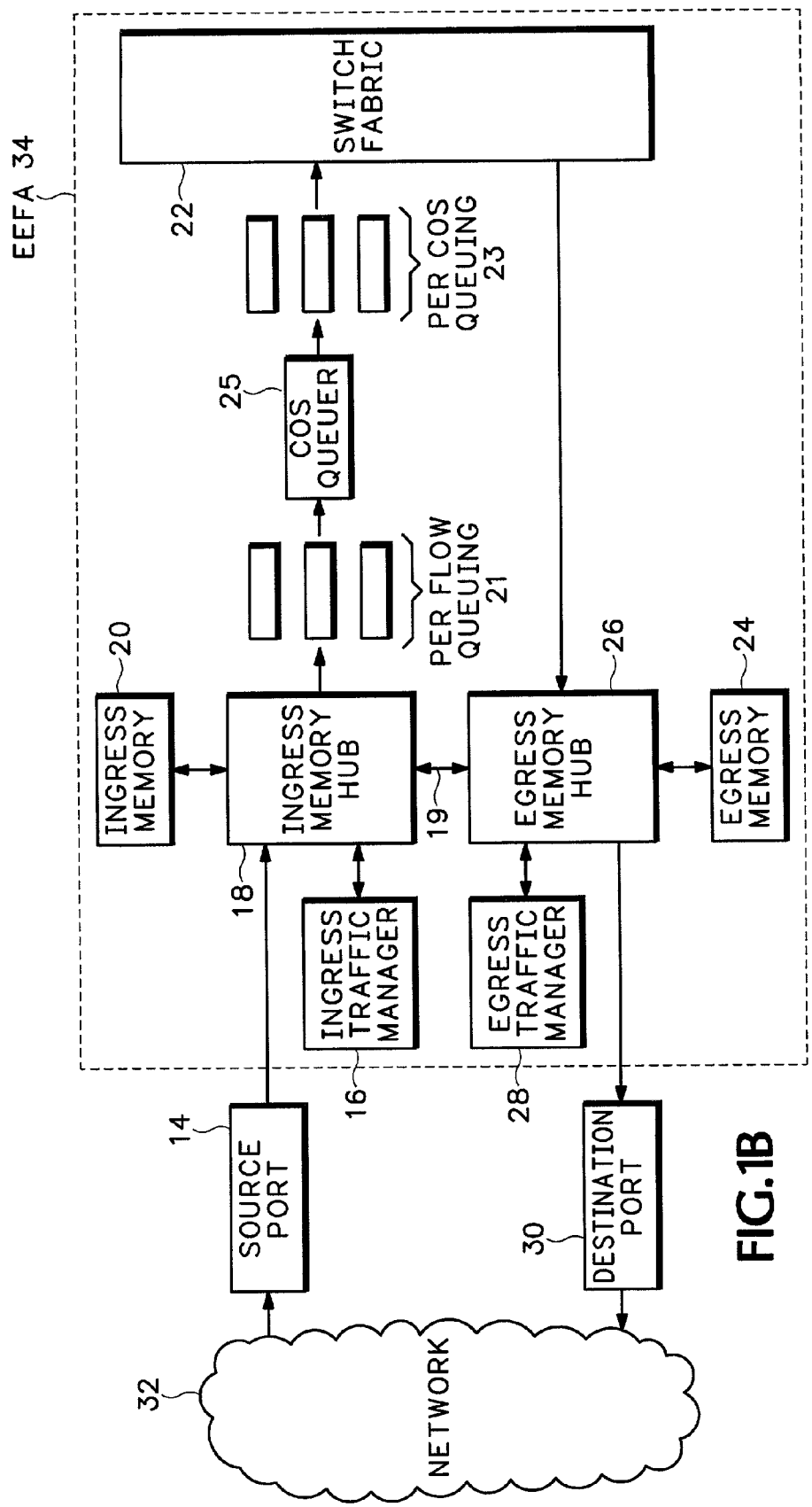
FIG. 1B is a block diagram of a second embodiment of the end to end forwarding architecture.

FIG. 1B shows an alternative embodiment of the architecture 34. The ingress traffic manager 16 uses per flow queuing to output packets 21 from ingress memory hub 18. A Class of Service (CoS) Queuer 25 receives the packets output by ingress memory hub 18. The CoS queuer 25 outputs packets 23 to the switch fabric 23 on a per CoS basis.

In all of the embodiments described above and below, the traffic manager can receive packet length information from the memory hub. The memory hub can also send the traffic manager Class of Service information used for scheduling packets. The traffic manager, memory hub and any packet processing circuitry, on the ingress or egress side of the switch fabric may be implemented in the same or different integrated circuits or circuit boards. The switch fabric may consist of a single switching element or multiple switching elements.

Figure 2:
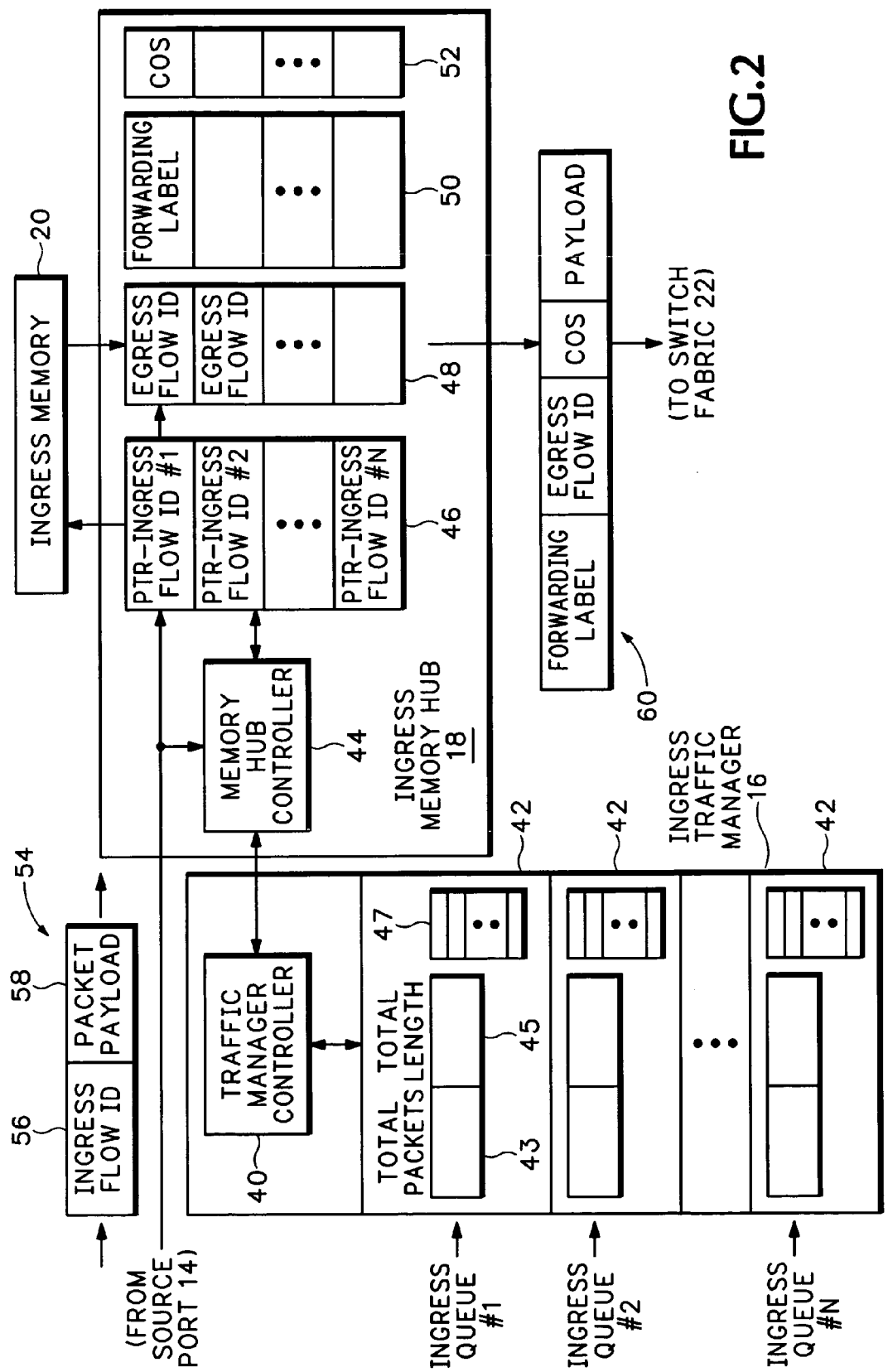
FIG. 2 is a detailed block diagram of the ingress side of the forwarding architecture shown in FIG. 1.

FIG. 2 is a more detailed diagram of the ingress traffic manager 16 and ingress memory hub 18 shown in FIG. 1. The ingress memory hub 18 includes a memory hub controller 44 that receives packet 54 from the source port 14. The packet 54 includes a header 56 and a packet payload 58. The header 56 identifies the ingress flow Id, the length, and possibly a Class of Service (CoS) for the packet. There are N number of ingress queues 46 that are supported in the ingress memory hub 18. Each ingress queue 46 is associated with a particular ingress flow Id and contains pointers to locations in ingress memory 20. Each ingress queue 46 has an associated egress flow Id field 48, forwarding label field 50, and CoS field 52.

The ingress traffic manager 16 includes a traffic manager controller 40 that communicates packet information with the memory hub controller 44. There are N ingress queues 42 in ingress traffic manager 16 that each correspond with one of the ingress queues 46 in the ingress memory hub 18. Each ingress queue 42 includes a field 43 that tracks the total number of packets and a field 45 that tracks the total length for all the packets for the associated ingress flow. Each ingress queue 42 also includes an ordered queue 47 that identifies the length of each packet received for that particular ingress flow Id in the order the packets are received. This is only one example of how the ingress queues 42 can be implemented.

The packet 54 is received at a first interface in ingress memory hub 18. The memory hub controller 44 writes the packet 54 into ingress memory 20 according to the ingress flow Id in header 56 and updates the pointers in the ingress queue 46 associated with the ingress flow Id to reflect the newly received packet 54. The memory hub controller 44 notifies the traffic manager controller 40 of the ingress flow Id and the length of the packet 54.

The ingress memory hub 18 binds the egress flow Id and forwarding label to the ingress flow Id. This binding may be done on a need basis or at the time of initialization.

The egress flow Id associated with the ingress flow Id is loaded into field 48, and the forwarding label associated with the ingress flow Id is loaded into field 50. The egress flow Id and forwarding label for a particular ingress flow Id are determined when the ingress flow is first set up from a source port to a destination port. The ingress flow Id can be determined based on final destination port and Class of Service or on some other criteria. The flow setup can be for guaranteed bandwidth flows, TDM flows, or best-effort flows. For TDM flows, binding is established at the time a new flow is established and remains valid only for the time that the flow remains valid. For best effort traffic, the ingress flow Id is bound with the egress flow Id and forwarding label during initial set-up.

Multiple source ports may send packets to the same destination port. It is possible that the same ingress flow Id value is used by two different source ports to send packets to the same destination port. The egress flow Id used in field 48 and the associated forwarding label in field 50 identify unique egress flow Ids for ingress flows directed to the same egress port.

The traffic manager controller 40, through memory hub controller 44, tracks the total number of packets received for each ingress flow Id, the total length of the ingress flow, and the lengths of each packet received for the ingress flow. The traffic manager controller 40 determines when to schedule packets for outputting to the switch fabric 22. When a packet is scheduled to be output, the traffic manager controller 40 sends an output request to the memory hub controller 44 and updates the total packet number and total ingress flow Id length in the associated ingress queue 42 to reflect the one less packet or cell sent to the switch fabric 22.

The memory hub controller 44 may break the packet into cells. The controller 44 uses the pointers in ingress queue 46 to read a cell or packet for the ingress flow Id identified by the traffic manager controller 40 and updates the pointer values for the identified ingress queue 46 to reflect the one less packet or cell. The memory hub controller 44 modifies the header for the outbound packet 60 by adding the forwarding label from field 50 and the egress flow Id from field 48.

The traffic manager controller 40 also monitors for ingress flow backups. When the number of packets for a particular ingress flow Id reaches some threshold, the traffic manager controller 40 can direct the memory hub controller 44 to discard packets for that particular ingress flow Id. Discarding packets can be performed either by adjusting the head pointer or the tail pointer in the ingress queue 46 or by dropping pointers to one or more packets in the middle of the ingress queue.

A Class of Service (CoS) value associated with the ingress flow Id may be provided in the header 56 or during initial setup. This CoS value is loaded into field 52. The CoS value is attached to the outbound packet 60 by memory hub controller 44. The ingress traffic manager 16 can, however, reclassify the CoS value used for the outbound packet 60. The memory hub controller 44 would then add this reclassified CoS value to the header of packet 60. The switch fabric 22 routes the packet 60 according to the forwarding label and possibly the CoS value assigned to the packet 60.

FIG. 3 is a more detailed diagram of the egress traffic manager 28 and egress memory hub 26 previously shown in FIG. 1. The switch fabric 22 establishes a forwarding path for the packet 60 according to the forwarding label. The egress memory hub 26 includes a memory hub controller 66 that receives the packet 60 output from the switch fabric 22.

The packet 60 is queued in egress memory 24 according to the egress flow Id in the packet header and the pointers in the egress queue 68 associated with that egress flow Id. The memory hub controller 66 updates the pointers in the queue 68 and notifies the egress traffic manager 28 of the egress flow Id value and length of the packet 60. Packets may be converted into cells on the ingress side of the switch fabric. Cells are portions of packets. If packets are sent as cells, the egress memory hub 26 combines the cells back into packets.

The traffic manager controller 62 schedules the output of packets from egress memory 24 to the destination port 30. The egress traffic manager 28 includes egress queues 64 that are each associated with a particular egress flow Id. The egress queues 64 each include a field 61 for tracking the total number of packets for the egress flow Id and a field 63 for tracking the total length of the egress flow Id. An ordered queue 65 in each egress queue 64 tracks the individual length of packets and the order that those packets are received by the egress memory hub 26.

During flow setup, egress memory hub 26 receives the ingress flow Id and forwarding label identifying a path to the source port for egress flow Ids. The egress memory hub 26 binds the ingress flow Id in field 70 and the forwarding label value in field 72 to the egress flow Id in egress queue 68. The egress traffic manager 28 identifies any egress flow Ids that are backing up in egress memory 24. If the number of packets or length of data identified for one of the egress queues 64 starts to backup, the egress traffic manager 28 can direct the egress memory hub 26 to initiate a back pressure command to the source port identified in forwarding label field 72 that is sending the packets.

In a typical case, a control message is sent via control lines 19 to the ingress memory hub 18 (FIG. 2). The control message requests the ingress memory hub 18 to send a control packet to a particular forwarding label port causing the backup. The ingress memory hub 18 sends the control packet to the egress memory hub for the port identified in the control packet forwarding label. The control packet contains the ingress flow ID associated with the backup egress flow Id. The egress memory hub receiving the control packet then notifies the ingress side of that same port of the ingress flow Id causing the back up.

If the number of packets or length of a particular egress flow Id gets too large, the traffic manager controller 62 may direct the egress memory hub controller 66 to drop packets for the identified egress flow Id. The memory hub controller 66 drops packets by adjusting the pointer values in egress queue 68 for the identified egress flow. Packets may be discarded either at the head of the queue or at the tail of the queue. The traffic manager controller 62 may also notify the memory hub controller 66 to discard particular packets in the middle of the egress queue 68.

FIG. 4 shows how multicast packets are transferred by the architecture 34. In one scheme, during flow setup, traffic management software tries to find a common egress flow Id available in each of the egress memory hubs 80, 82, and 84 associated with the destination ports for the multicast packet 76. If there is not a common egress flow Id available in each one of the egress memory hubs 80, 82, and 84, a second Content Addressable Memory (CAM) scheme is used. In the CAM scheme, a group of egress queues in the egress memory hubs 80, 82, and 84 are dynamically remapped to a range of different values.

For example, there may be 32K egress queues 68 in each one of the egress memory hubs 80, 82, and 84. The first 28K egress queues are mapped one to one with egress flow Ids. Thus, egress flow ID value 400 is mapped into egress queue #400 and egress flow Id value 23,235 is mapped into egress queue #23,235. The last 4,000 (4K) egress queues 68 in the egress memory hubs 80, 82 and 84 can be assigned any one of 32K different values starting at 32K and ending at 64K. The traffic management software only has to find one of the 32K–64K values that is free for each of egress memory hubs 80, 82, and 84. The free value is then mapped by CAM 86 to any unused one of the last 4K egress queues 68 in egress memory hubs 80, 82, and 84. The unused egress queue may be different in each one of the egress memory hubs 80, 82, and 84. The common CAM value is loaded into the egress flow Id field 48 for the ingress flow ID associated with the multicast packet 76.

During setup, the ingress memory hub 18 also becomes aware of the forwarding label value associated with the ingress flow Id. The forwarding label value is loaded into forwarding label field 50. The forwarding label value is used by the switch fabric to establish paths to the multiple destination ports where the multicast packet 76 is directed.

The multicast packet 76 is scheduled by the ingress traffic manager 16 for outputting from ingress memory hub 18 to switch fabric 22. The ingress memory hub 18 adds the egress flow Id (CAM value) and the forwarding label value to the header of the multicast packet 76 before outputting the packet to switch fabric 22.

The switch fabric 22 reads the forwarding label in the multicast packet. A forwarding table 78 decodes the forwarding label to determine the forwarding paths to destination ports for the multicast packet 76. The switch fabric 22 then forwards the multicast packet along the forwarding paths to the identified destination ports. In the example shown in FIG. 4, the packet is sent to egress memory hubs 80, 82, and 84 each associated with one of the destination ports identified for the multicast packet 76.

The egress hub controller 66 for each destination port reads the egress flow Id value in packet 76. Because the egress flow Id value is within a predetermined range, for example, greater than 32K, the egress flow Id value is read by CAM 86. The CAM 86 maps the packet to the unused queue in queues 68 previously identified for that egress flow Id.

The egress traffic manager 28 is sent the same egress flow Id by the egress hub controller 66. The egress traffic manager 28 also has 32K egress queues 64 and knows to use CAM 88 for any egress flow Id values greater than 32K. The CAM 88 maps the egress flow Id to the same relative location in egress queue 64 that CAM 86 mapped the egress flow Id to in egress queues 68. The egress traffic manager 28 then schedules the multicast packet for outputting to the destination port associated with the egress memory hub. This process is conducted in parallel in each one of the egress memory hubs 80, 82 and 84.

Figure 5A:
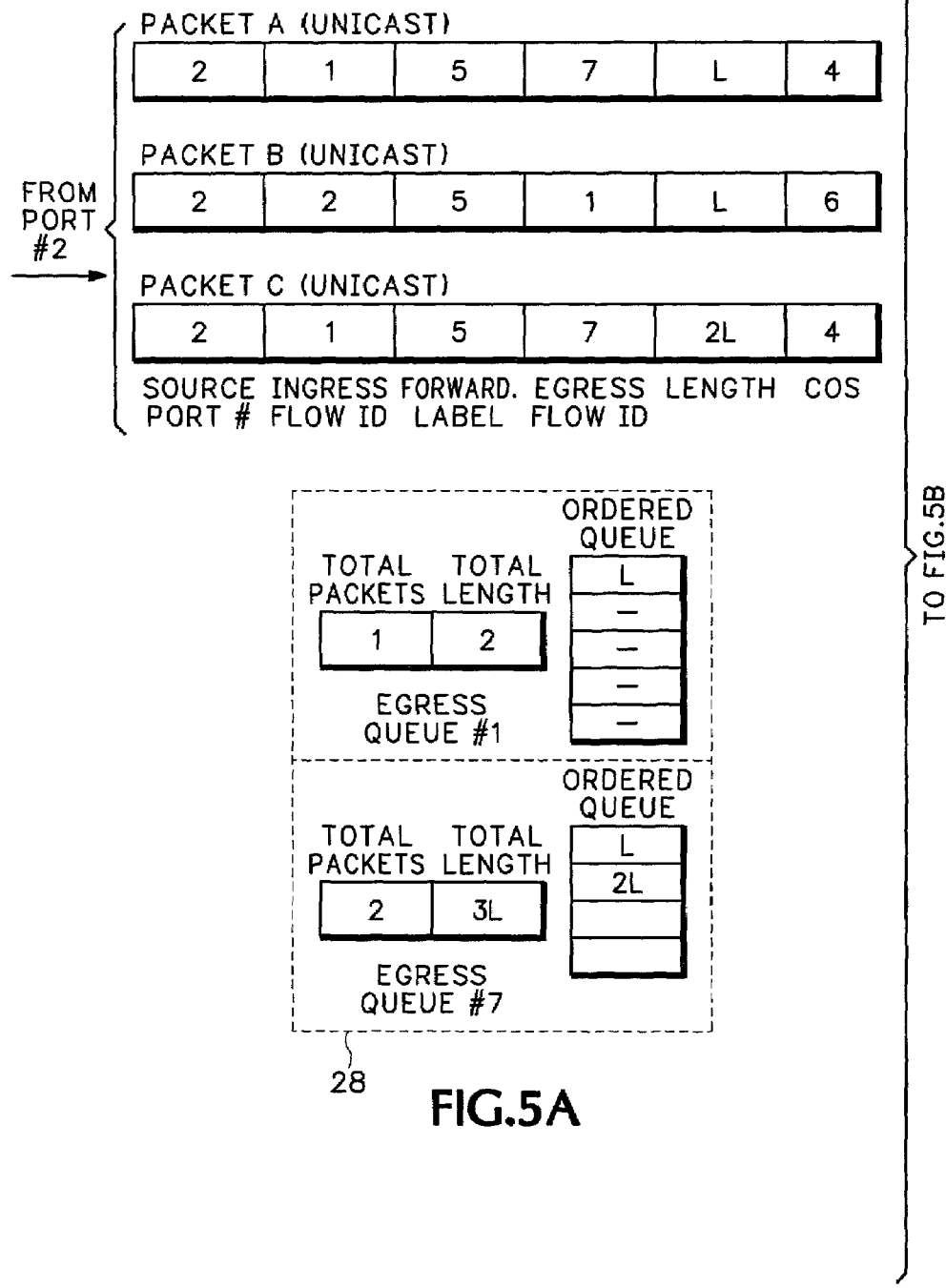
FIG. 5 is a diagram showing one example how unicast packets are queued using the end to end forwarding architecture.
Figure 5B:
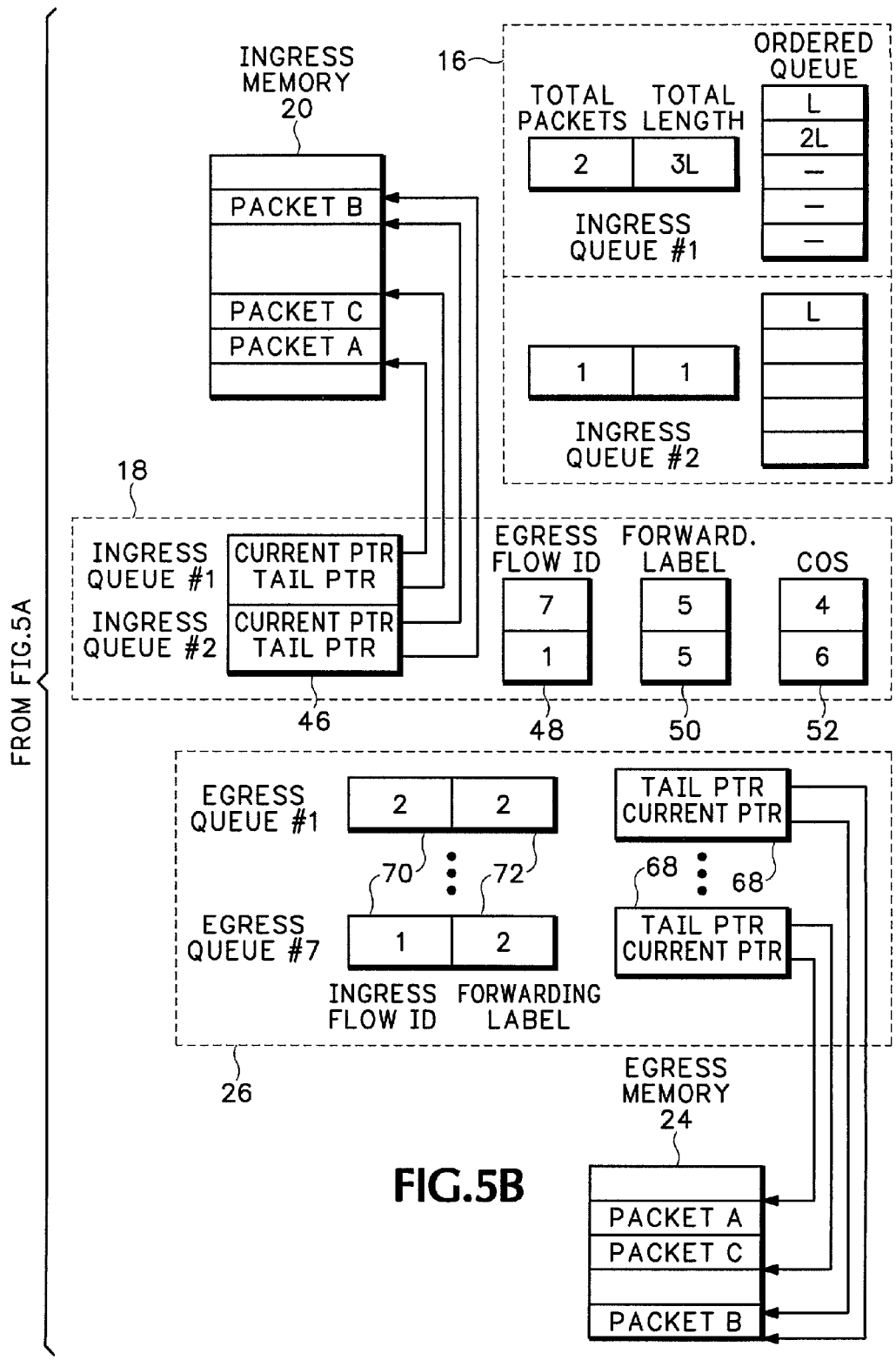

FIG. 5 shows one example how unicast packets are forwarded. Packets A, B and C are all unicast packets, all come from source port number 2, and are all need to be directed to destination port 5. Packets A and C are part of ingress flow 1 and are assigned to egress flow 7. Packet B is part of ingress flow 2 and assigned to egress flow 1. Packets A and B have length L while packet C has a length 2L. Packets A and C have CoS values of 4, and packet B has a CoS value of 6. The headers of ingress packets A, B and C only include the ingress flow Id and the CoS values. However, the other parameters are shown in FIG. 5 for packets A, B and C for illustrative purposes.

The ingress memory hub 18 stores packets A and C in ingress memory 20 as part of the same ingress flow Id #1. If packets A and C are the first two packets for ingress flow #1, then a current pointer for ingress queue #1 contains the beginning address of packet A and a tail pointer in ingress queue #1 identifies the first byte of the last entry for packet C. Assuming packet B is the only packet for ingress flow #2, ingress queue #2 will have a current pointer identifying the beginning address of packet B and a tail pointer identifying the first byte of the last entry for packet B. The egress flow Id value "7" is loaded into the egress flow Id field 48 for ingress flow #1. The egress flow Id value "1" is loaded into the egress flow Id field 48 for ingress flow #2. The forwarding label value "5" is loaded into the forwarding label fields 50 for both ingress flow Ids #1 and #2.

The ingress traffic manager 16 updates ingress queues #1 and #2. The ingress queues #1 and #2 track the total packets, total length, and individual packet lengths for ingress flows Ids #1 and #2. Ingress queue #1 indicates two total packets and a total length for ingress flow Id #1 as 3L. An ordered queue for ingress flow Id #1 identifies the order and size of the received packets A and C as L and 2L, respectively. Ingress queue #2 in ingress traffic manager 16 identifies the total number of received packets as 1 and the total length of ingress flow Id #2 as L. The ordered queue for ingress queue #2 has only one entry identifying packet B as length L.

The packets A, B, and C are scheduled by the ingress traffic manager 16 for outputting to the switch fabric. The forwarding labels in field 50 and egress flows Ids in field 48 are attached to the outgoing packets. The CoS values in field 52 can also be attached to the packets before being sent to the switch fabric. Before outputting the packets A, B, and C, the ingress traffic manager 16 may change any CoS value currently assigned to any one of the packets A, B, or C.

The packets A, B, and C are received at the egress memory hub 26. The packets A and C are stored in egress memory 24 through egress queue #7 and packet B is stored in egress memory 24 through queue #1. It is also assumed that there are no other packets currently residing in egress memory 24 for egress flows #1 and #7. The current pointer in egress queue #1 contains the address for the beginning of packet B and the tail pointer in egress queue #1 identifies the first byte of the last entry for packet B. Similarly, the current pointer in egress queue #7 contains the address for the beginning of packet A and the tail pointer in egress queue #7 contains the first byte for the last entry for packet C.

In this example there are no other packets in the egress memory 24 associated with egress flows #1 and #7. However, if there were other packets already in egress memory 24 associated with egress flows #1 or #7, the current pointer for egress queues #1 and #7 would point to the first earlier received packet for that egress flow Id. The forwarding label fields 72 associated with both egress queue #1 and egress queue #7 are each set to 2. The ingress flow Id in field 70 for egress queue #1 is set to 2 and the ingress flow Id in field 70 for egress queue #7 is set to 1.

The egress traffic manager 28 updates egress queue #1 to indicate one total packet and a total egress flow Id length of L. The ordered queue identifies one packet of length L. The egress queue #7 is updated to indicate two total packets and a total length for egress flow Id #7 as 3L. The ordered queue for egress flow Id #7 has a first entry for packet A at length L and a second entry for packet C at length 2L.

The egress traffic manager 28 schedules the packets A, B, and C for outputting to destination port 5. The schemes used for scheduling the packets are already known to those skilled in the art and are therefore not described in further detail.

If the number of packets for either egress queue #1 or egress queue #7 backs up, the egress traffic manager 28 and the egress memory hub 26 can send back-pressure control requests to source port 2. The control request identifies the ingress flow causing the back up. As described above, if too many packets for a particular egress flow back up, the egress traffic manager 28 can direct the egress memory hub 26 to drop packets in egress memory 24.

FIG. 6 describes in further detail how a multicast packet D is forwarded. The multicast packet D comes from source port #3 and has an ingress flow Id of 6. During initial flow setup the forwarding label value for multicast packet D was identified as 100. Forwarding label 100 represents the paths that the switch fabric will establish to direct packet D to destination ports 6, 7, 9, and 12. The length of the multicast packet is 3L and the CoS value is 5. There are 32K available egress queues 68 in the egress memory hub 26. The last 4K egress queues 68 are available for CAM addressing for any value between 32K and 64K.

Traffic management software queries the egress memory hubs for destination ports 6, 7, 9, and 12 for a common unused egress flow Id. If none are available, a common CAM value is requested for one of the last 4K egress queues 68. A common CAM value of 50K is identified. The CAM 86 for egress ports 6, 7, 9, and 12 each map the value 50K to one of the last 4K egress queues that is currently unused. The unused egress queue may be different in each egress memory hub.

The ingress memory hub 18 reads the multicast packet D into ingress memory 20 and updates pointers in ingress queue #6. The egress flow Id field 48 is set to 50K, the forwarding label field 50 is set to 100, and the CoS field 52 is initially set to 5. The ingress traffic manager 16 updates the corresponding ingress queue #6 to reflect a total number of packets as 1 and a total length of 3L. The ordered queue shows one packet of length 3L. The ingress traffic manager 16 schedules the multicast packet D in ingress memory 20 for outputting to the switch fabric. In this example, the ingress traffic manager 16 modifies the original CoS value of 5 to a CoS value of 4 before sending the packet to the switch fabric.

Each of the egress memory hubs 26 associated with destination ports 6, 7, 9, and 12 receive packet D. Only the egress memory hub for destination port #9 is shown in FIG. 6. The egress memory hub 26 reads the 50K value in the egress flow field in packet D. The 50K egress flow value indicates a CAM lookup. The value 50K is fed into CAM 86. The CAM 86 maps the 50K value to the previously identified free queue in egress queues 68. In this example, the previously identified free queue is egress queue #30,100. The ingress flow Id value 6 is stored in ingress flow Id field 70 and the value 3 is stored in the forwarding label field 72 for egress queue #30,100.

In a similar manner, the egress traffic manager 28 uses CAM 88 and egress flow Id value 50K to locate egress queue #30,100. The total number of packets (1) and the total length (3L) are added to the egress queue #30,100. The ordered queue has one entry identifying a packet having length 3L. The egress traffic manager 28 then schedules the packet D for outputting to destination port #9. A similar process is conducted in parallel for destination ports 6, 7, and 12.

Figure 7:
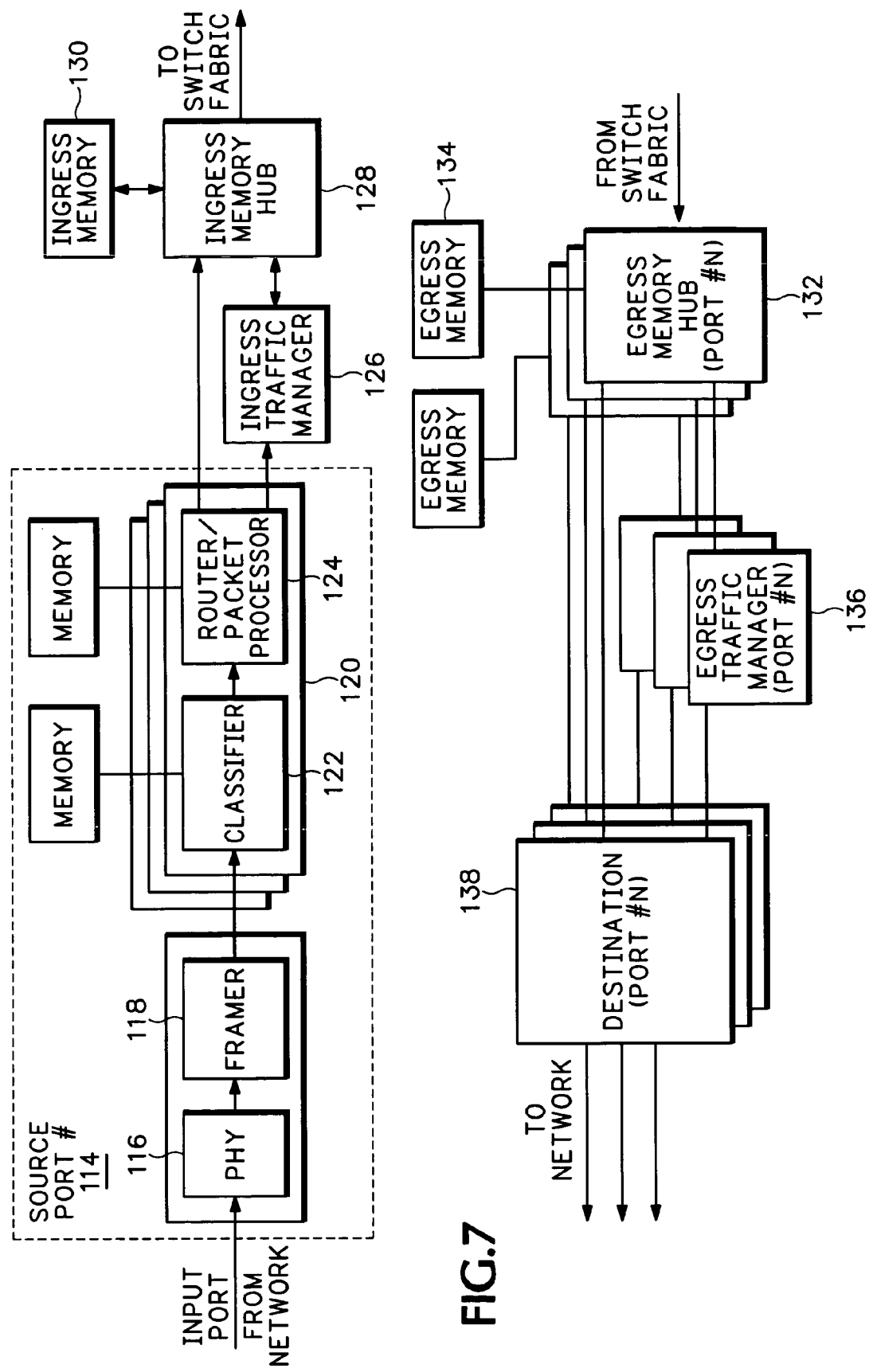
FIG. 7 is a diagram showing in more detail a network processing system using the end to end forwarding architecture shown in FIG. 1.

FIG. 7 is a more detailed diagram of the network processor used with the architecture 34. One of multiple source ports 114 includes a physical interface 116 and a framer 118 that receive incoming packets from a network. One of multiple network processing cards 120 include a classifier 122 that classifies the incoming packets into different flows. A routing and packet processor 124 attaches header information to the packets that identify the ingress flow Id for the packets. The routing and packet processor 124 may use a flexible encapsulation layer to attach the flow Id information to the packets. Flexible encapsulation is described in copending application entitled: A METHOD AND APPARATUS FOR FLEXIBLE LAYER ENCAPSULATION, filed Dec. 13, 2000, U.S. Ser. No. 09/737,657.

The ingress memory hub 128 receives and queues the packets using ingress memory 130. The ingress traffic manager 126 then uses ingress memory hub 128 to output the packets to a switch fabric (not shown). The switch fabric establishes a path for transferring the packets to a destination port according to a forwarding label value added to the packet header by the ingress memory hub 128. The egress memory hub 132 associated with that forwarding label destination port receives the packets. The egress traffic manager 136 uses the egress memory hub 132 to queue the packets to the associated destination port 138.

Figure 8:
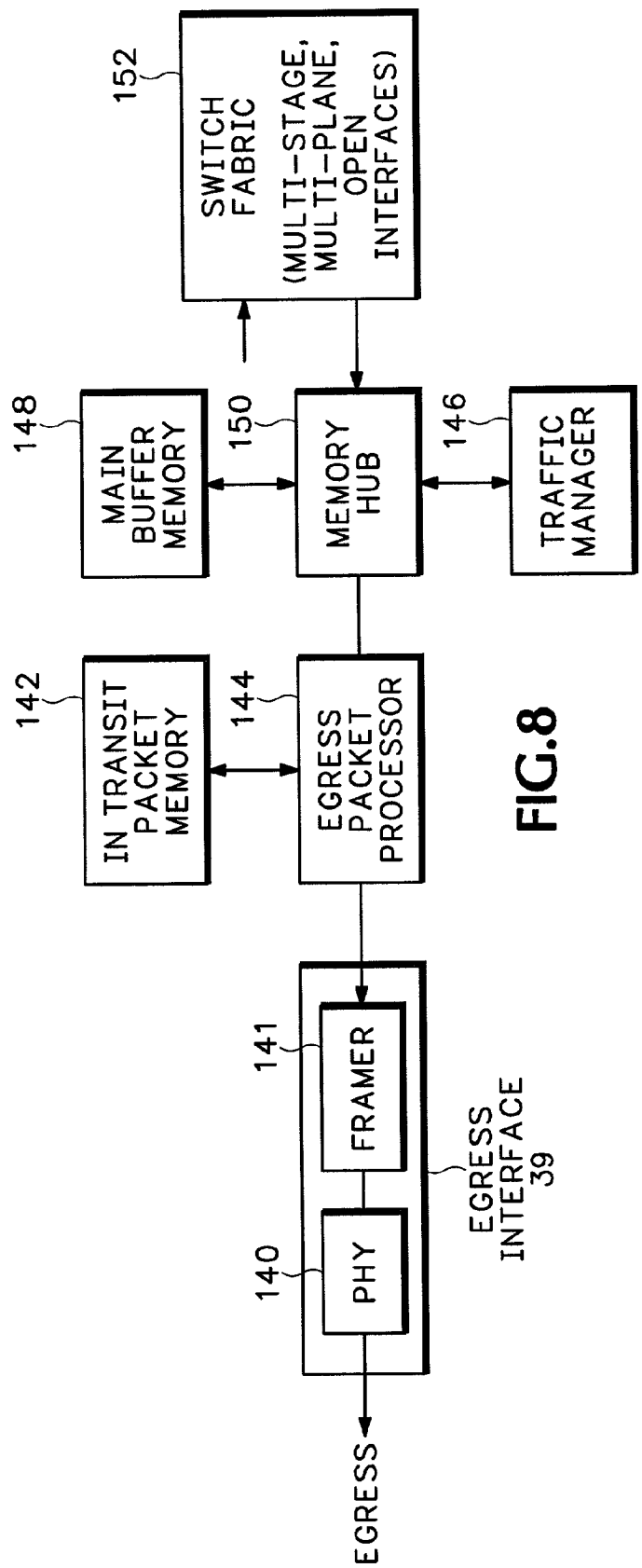
FIGS. 8–10 show alternative embodiments of the egress memory hub and egress traffic manager.
Figure 9:
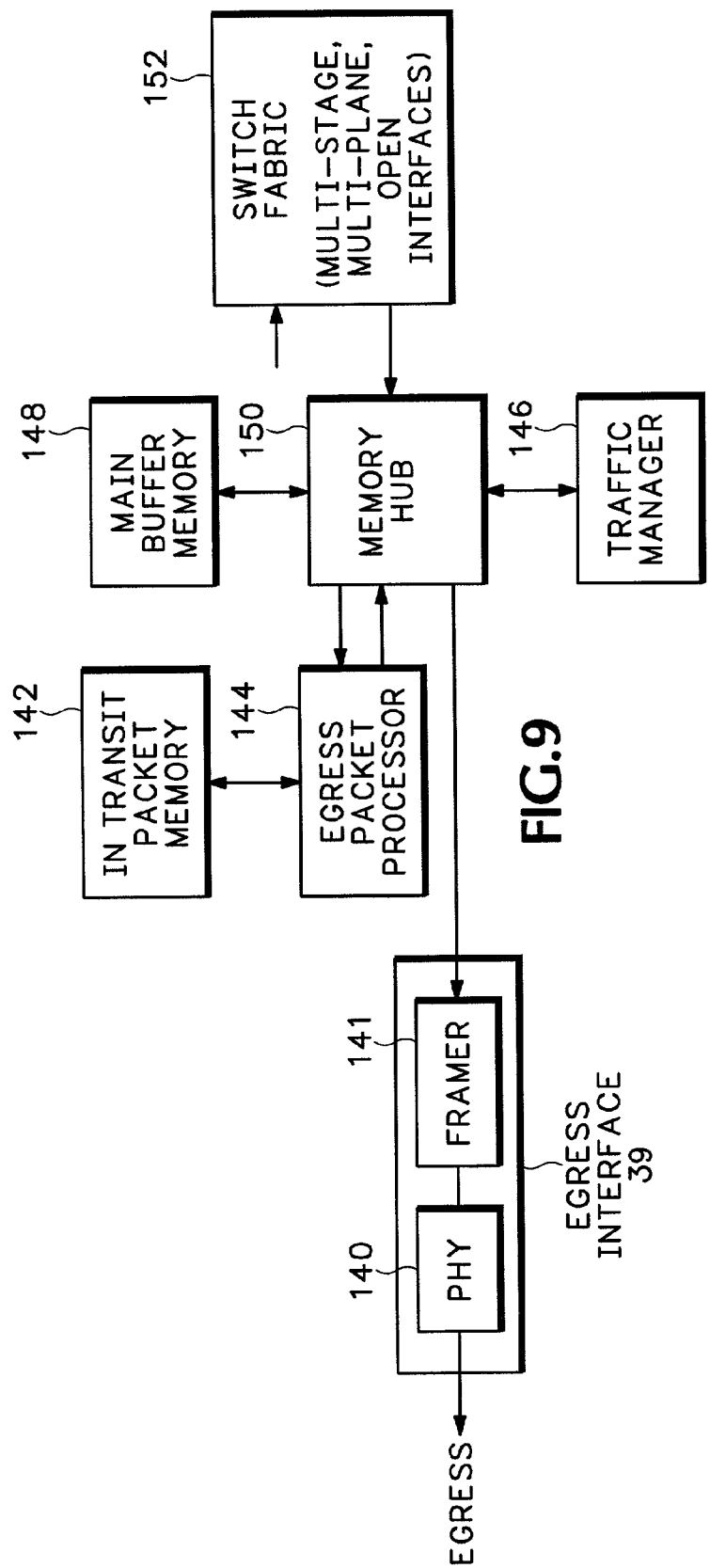
Figure 10:
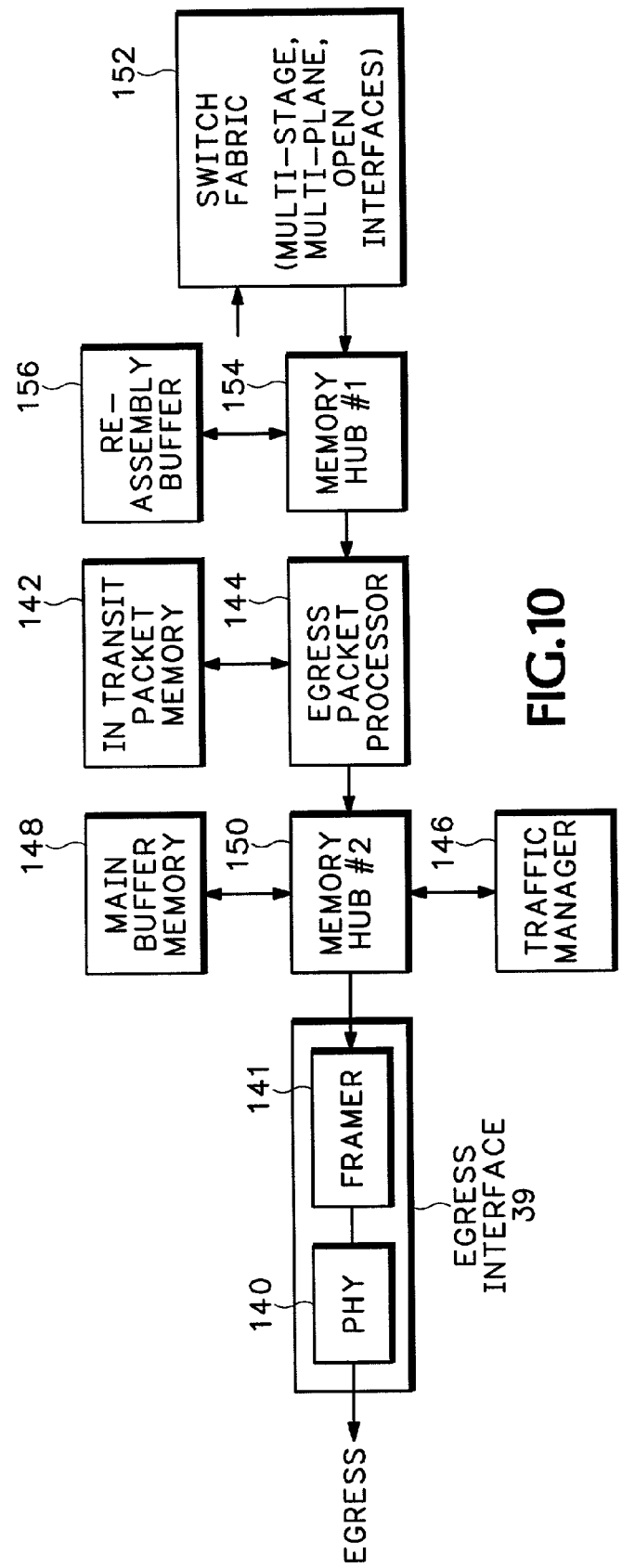

FIGS. 8–10 show different arrangements for the memory hub and traffic manager on the egress side of the network processing device. All of these configurations forward data based in the ingress flow Id and the egress flow Id as described above. In FIG. 8 the switch fabric 152 outputs data comprising either packets or packet fragments (cells) to the memory hub 150.

The memory hub 150 queues the data into main buffer memory 148 according to the egress flow Id. The length of the packets assembled by the memory hub 150 are communicated to the traffic manager 146. The traffic manager 146 schedules the outputting of the packets to an egress packet processor 144. The egress packet processor 144 uses an in transit packet memory 142 to add any necessary information to the headers of the packets before the packets are output to framer 141 and physical interface 140 in egress interface circuitry 39.

In a high bandwidth system, the egress packet processor 144 might implement fixed functions on the packets output to framer 141. The functions performed by the egress packet processor 144 will not change the scheduling decisions made by the traffic manager 146. Further, if the egress packet processor 144 changes the packet length, that length is accounted for in the length value sent to the traffic manager 146 from the ingress circuitry. One advantage of the architecture shown in FIG. 8 is that only one main buffer memory 148 is required to assemble packet fragments into packets and dequeue the assembled packets to the egress packet processor 144. Further only one memory write and one memory read to main buffer memory 148 is required for each packet or packet fragment received from the switch fabric 152.

FIG. 9 shows another arrangement for the memory hub and traffic manager on the egress side of the switch fabric 152. The memory hub 150 receives packets or packet fragments from the switch fabric 152. The memory hub 150 assembles the packet fragments if necessary into packets and outputs the assembled packets to the egress packet processor 144 on a First In-First Out basis or based on some other criteria.

The egress packet processor 144 changes or adds information to the packet headers and then sends the packets back to the memory hub 150. The packet lengths for the packets received back from the egress packet processor 144 are sent from the memory hub 150 to the traffic manager 146. The traffic manager 146 then schedules the packets queued in the memory hub 150 for outputting to the framer 141 in egress interface 39. The architecture shown in FIG. 9 allows any function to be performed by the egress packet processor 144 and still requires only one main buffer memory 148 for assembling and queuing packets.

FIG. 10 shows another arrangement of the egress circuitry on the egress side of switch fabric 152. The switch fabric 152 outputs packets or packet fragments to a first memory hub 154. The first memory hub 154 uses a reassembly buffer 156 to reassemble packet fragments back into whole packets according to the egress flow Ids. The reassembled packets are output to the egress packet processor 144 which then adds any necessary information to the packet headers.

The packets are output from the egress packet processor 144 to a second memory hub 150 and queued in main buffer memory 148 according to the packet egress flow Id. The packet lengths are relayed by the memory hub 150 to the traffic manager 146. The traffic manager 146 then schedules the outputting of packets from the memory hub 150 to the framer 141 in the egress interface 39. The bandwidth may be increased for the architecture shown in FIG. 10 since buffers 148 and 156 are required to perform fewer read and writes.

In all of the embodiments described above, the traffic manager 146 receives packet length information from the memory hub. The memory hub 150 can also send the traffic manager Class of Service information used for scheduling packets. The traffic manager 146, memory hub 150 and packet processor 144, on the ingress or egress side of the switch fabric may be implemented in the same or different integrated circuits or circuit boards. The switch fabric 152 may consist of a single switching element or multiple switching elements.

It should be understood that the architectures described above can be used with any switch fabric architecture or processing device that needs to queue data. The memory hub may also be used alone without the traffic manager described above. The queuing and dequeuing of packets from the memory hub would then be controlled by some other circuitry internal to the memory hub or some external device. If an external device is used, the external device could provide the flow Id values necessary for the memory to queue and dequeue data.

The architecture can send fragmented parts of the same packet from the ingress side of the switch fabric. The packet fragments are then reassembled on the egress side of the switch fabric before being forwarded to the destination ports. Alternatively, entire packets or multiple packets can be sent from the ingress side of the switch fabric. The forwarding architecture can be used with any high speed serial interface.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the architecture can be implemented by themselves, or in combination with other operations in either hardware or software.

Having described and illustrated the principles of the invention in a preferred embodiment thereof, it should be apparent that the invention may be modified in arrangement and detail without departing from such principles. We claim all modifications and variation coming within the spirit and scope of the following claims.

The invention claimed is:

1. A memory hub, comprising:
a first ingress interface for receiving from a source port packets having associated ingress flows and assigning ingress flow values to the packets associated with the ingress flows that identify packets having similar Class of Service processing requirements and storing the packets in an ingress memory;
a second ingress interface for outputting packets or cells to a switch fabric connecting the first and second ingress interface to an egress interface and egress memory;
an ingress controller that queues the packets or cells in the ingress memory for sending to the egress memory via the switch fabric according to the Class of Service processing requirements identified by the associated ingress flow values; and
egress flow fields for assigning egress flow Ids to the packets or cells according to the associated ingress flows.

2. A memory hub according to claim 1 including an ingress traffic manager that schedules how the packets or cells are output to the switch fabric, the traffic manager modifying an assigned Class of Service for the packets and assigning the modified Class of Service to the packets before being output to the switch fabric.

3. A memory hub according to claim 2 wherein the ingress traffic manager schedules outputting of the packets or cells to the switch fabric on a per Class of Service basis or per destination basis.

4. A memory hub according to claim 2 wherein the ingress controller manages memory operations for queuing the packets or cells independently of controls from the ingress traffic manager.

5. A memory hub according to claim 2 wherein the ingress controller and the ingress traffic manager are separate circuits operating on separate integrated circuits.

6. A memory hub according to claim 2 wherein the ingress traffic manager directs the ingress controller to drop packets or cells for ingress flows that back up.

7. A memory hub according to claim 1 wherein the ingress flow values are assigned independently of the source port receiving the packets.

8. A memory hub according to claim 1 including forwarding label fields for assigning forwarding labels to the packets or cells according to the associated ingress flows.

9. A memory hub according to claim 8 wherein the forwarding label fields contain information for establishing a path in the switching fabric to a destination port.

10. A memory hub according to claim 1 wherein the memory hub is an integrated circuit having a first interface for communicating with one or more source ports, a second interface for communicating with an ingress traffic manager, a third interface for communicating with a switch fabric and a fourth interface for communicating with an external memory.

11. A memory hub comprising:
a first ingress interface for receiving from a source port packets having associated ingress flows and assigning ingress flow values to the packets associated with the ingress flows that identify packets having similar Class of Service processing requirements and storing the packets in an ingress memory;
a second ingress interface for outputting packets or cells to a switch fabric connecting the first and second ingress interface to an egress interface and egress memory;
a ingress controller that queues the packets or cells in the ingress memory for sending to the egress memory via the switch fabric according to the Class of Service Processing requirements identified by the associated ingress flow values; and
a Class of Service queuer that receives packets or cells output from the second ingress interface on a per flow basis and sends the packets or cells to the switch fabric on a per Class of Service associated basis.

12. A memory hub comprising:
a first ingress interface for receiving from a source port packets having associated ingress flows and assigning ingress flow values to the packets associated with the ingress flows that identify packets having similar Class of Service processing requirements and storing the packets in an ingress memory;
a second ingress interface for outputting packets or cells to a switch fabric connecting the first and second ingress interface to an egress interface and egress memory;
an ingress controller that queues the packets or cells in the ingress memory for sending to the egress memory via the switch fabric according to the Class of Service processing requirements identified by the associated ingress flow values;

an egress controller having a first interface for receiving packets or cells output from the switch fabric having associated egress flows;
a second interface for transferring the packets to a destination port; and
an egress controller configured to manage how the packets are queued to the destination port according to the associated egress flows, the egress controller tracking packet size information for the egress flows and queuing the packets for outputting to destination ports according to the tracked packet size information.

13. A memory hub according to claim 12 including egress queues for maintaining pointers to the packets or cells received from the switch fabric according the associated egress flows.

14. A memory hub according to claim 13 including forwarding label fields for identifying forwarding labels for the egress queues.

15. A memory hub according to claim 14 wherein the forwarding label fields identify source ports.

16. A memory hub according to claim 13 wherein the egress traffic manager notifies the egress memory hub to drop packets or cells for egress queues that back up.

17. A memory hub according to claim 12 including an egress traffic manager that receives egress flow information from the egress controller and schedules the egress controller to output packets to the destination port according to the egress flow information.

18. A memory hub according to claim 1 comprising:
a first ingress interface for receiving from a source port packets having associated ingress flows and assigning ingress flow values to the packets associated with the ingress flows that identify packets having similar Class of Service processing requirements and storing the packets in an ingress memory;
a second ingress interface for outputting packets or cells to a switch fabric connecting the first and second ingress interface to an egress interface and egress memory;
an ingress controller that queues the packets or cells in the ingress memory for sending to the egress memory via the switch fabric according to the Class of Service processing requirements identified by the associated ingress flow values; and
wherein the first ingress interface stores the packets in an external ingress memory and the second ingress interface outputs the packets from the external ingress memory through the switch fabric to an external egress memory according to the ingress flow values associated with the packets.

19. A method for forwarding packets in a network processing device, comprising:
receiving packets associated with ingress flows;
assigning internal ingress flow ID values to the packets that identify packets having similar processing requirements, assigning the internal flow ID values independently of source addresses or destination addresses associated with the packets;
assigning egress flow Id values to the packets according to the associated ingress flows;
queuing the packets for sending to an egress queue according to the associated ingress flow Id values; and
outputting the queued packets to an egress memory hub according to the ingress flow ID values, the output packets including the egress flow Id values.

20. A method according to claim 19 including managing memory operations for queuing the packets in a first integrated circuit and independently managing in a second integrated circuit how the queued packets are scheduled for being output.

21. A method according to claim 19 including outputting the queued packets on a per flow basis and requeuing the output packets for outputting to a switch fabric for sending to an egress memory on a per Class of Service basis.

22. A method according to claim 19 including identifying egress flows for the ingress flows and assigning the identified egress flows to the packets before being output.

23. A method according to claim 19 including queuing the packets for sending over a switch fabric to an egress queue according to the ingress flow ID values and then re-queuing the packets in the egress queue for outputting over an external network interface according to the ingress flow ID values.

24. A method according to claim 19 including identifying a Class of Service for the ingress flows and assigning the Class of Service to the packets before being output to the switch fabric.

25. A method according to claim 19 including tracking ingress flow information for the packets and scheduling the packets for outputting to a switch fabric according to the tracked ingress flow information.

26. A method according to claim 25 including dropping queued packets when a back up is indicated by the tracked ingress flow information.

27. A method according to claim 19 including receiving the packets with associated egress flows from a switch fabric and queuing the packets for outputting to destination ports according to the egress flows.

28. A method according to claim 19 including providing an Egress flow Id, Class of Service, or forwarding label value with the received packets.

29. A method according to claim 19 including providing an Egress flow Id, Class of Service, or forwarding label value in a memory hub data structure.

30. A method for forwarding packets in a network processing device comprising:
receiving packets associated with ingress flows;
assigning internal ingress flow ID values to the packets that identify packets having similar processing requirements, assigning the internal flow ID values independently of source addresses or destination addresses associated with the packets;
assigning the ingress flow ID values to the packets on a per Class of Service basis independently of an ingress port receiving the packets and an egress port outputting the packets;
queuing the packets for sending to an egress queue according to the associated ingress flow Id values; and
outputting the queued packets to an egress memory hub according to the ingress flow ID values.

31. A method for forwarding packets in a network processing device, comprising:
receiving packets associated with ingress flows;
queuing the packets according to the associated ingress flows;
identifying ingress flow information for the packets;
outputting the queued packets according to the ingress flow information;
identifying a Class of Service for the ingress flows and assigning the Class of Service to the packets before being output to the switch fabric; and
modifying the assigned Class of Service and assigning the modified Class of Service to the packets before being output.

32. A method for forwarding packets in a network processing device, comprising:
receiving packets associated with ingress flows;
assigning internal ingress flow ID values to the packets that identify packets having similar processing requirements, assigning the internal flow ID values independently of source addresses or destination addresses associated with the packets;
queuing the packets for sending to an egress queue according to the associated ingress flow Id values;
outputting the queued packets to an egress memory hub according to the ingress flow ID values;
receiving the packets with associated egress flows from a switch fabric and queuing the packets for outputting to destination ports according to the egress flows; and
associating forwarding labels and ingress flows with the egress flows for the packets received from the switch fabric.

33. A method for forwarding packets in a network processing device, comprising:
receiving packets associated with ingress flows;
queuing the packets according to the associated ingress flows;
identifying ingress flow information for the packets;
outputting the queued packets according to the ingress flow information;
receiving the packets with associated egress flows from a switch fabric and queuing the packets for outputting to destination ports according to the egress flows;
associating forwarding labels and ingress flows with the egress flows for the packets received from the switch fabric; and
identifying egress flows that are backing up and notifying source ports causing the back up using the ingress flows and forwarding labels associated with the identified egress flows.

34. A method for forwarding packets in a network processing device, comprising:
receiving packets associated with ingress flows;
assigning internal ingress flow ID values to the packets that identify packets having similar processing requirements, assigning the internal flow ID values independently of source addresses or destination addresses associated with the packets;
queuing the packets for sending to an egress Queue according to the associated ingress flow Id values;
outputting the queued packets to an egress memory hub according to the ingress flow ID values; and
identifying unused egress queues for each egress port associated with a multicast packet, using a common CAM value to map to the unused egress queues in each egress port, and assigning the CAM value to the multicast packet as an egress flow value.

35. A method according to claim 34 including:
receiving the multicast packet from a switch fabric;
using the CAM value in the multicast packet to access a content addressable memory; and
using an egress queue mapped by the content addressable memory as the egress queue for the multicast packet.

36. A method for forwarding packets in a network processing device, comprising:
receiving packets associated with ingress flows;
queuing the packets according to the associated ingress flows;
identifying ingress flow information for the packets;
outputting the queued packets according to the ingress flow information;
identifying egress flows for the ingress flows and assigning the identified egress flows to the packets before being output; and
tracking packet size information for the egress flows and queuing the packets for outputting to destination ports according to the tracked packet size information.

37. A memory hub, comprising:
a first interface for receiving packets or packet fragments having associated flow Ids;
a second interface for outputting the packets or packet fragments;
a third interface for communicating with another memory hub, where one of the memory hubs initiates the communication in response to a packet flow backup corresponding to the initiating memory hub; where one of the memory hubs identifies the packet flow backup according to at least one of a number of the packets or packet fragments currently stored by that memory hub and an aggregate size of the packets or packet fragments currently stored by that memory hub; and
a controller that queues the packets or packet fragments in a memory according to the associated flow Ids and dequeues the packets from the memory according to the associated flow Ids.

38. A memory hub according to claim 37 wherein the first interface receives the packets or packet fragments from a switch fabric and the second interface outputs packets to an egress packet processor.

39. A memory hub according to claim 37 wherein the third interface communicates with an ingress memory hub when the third interface is operating in an egress memory hub.

40. A memory hub according to claim 39 wherein the first interface receives the packets or packet fragments from a switch fabric and the second interface outputs packets to an egress packet processor.

41. A memory hub according to claim 37 wherein the third interface communicates with an egress memory hub when the third interface is operating in an ingress memory hub.

42. A memory hub according to claim 37, wherein the third interface is used for sending information related to forwarding labels, ingress flow Id's, and control packets.

43. A memory hub, comprising:
a first interface for receiving packets or packet fragments having associated flow Ids;
a second interface for outputting the packets or packet fragments;
a controller that queues the packets or packet fragments in a memory according to the associated flow Ids and dequeues the packets from the memory according to the associated flow Ids;
wherein the memory hub is an integrated circuit with the first interface receiving the packets or packet fragments from a source port, the second interface outputting the packets or packet fragments to a switch fabric and including
a third interface for communicating with a traffic manager external to the memory hub, the traffic manager for directing the controller to dequeue packets from the memory and a fourth interface for communicating with an external memory.

44. A memory hub according to claim 43 where the traffic manager receives lengths of the packets via the third interface.

45. A memory hub, comprising:
a first interface for receiving packets or packet fragments having associated flow Ids;

a second interface for outputting the packets or packet fragments;
a controller that queues the packets or packet fragments in a memory according to the associated flow Ids and dequeues the packets from the memory according to the associated flow Ids;
wherein the first interface receives the packets or packet fragments from a switch fabric and the second interface outputs packets to an egress packet processor; and
another memory hub having a first interface configured to receive packets from the egress packet processor and a second interface configured to output packets to an egress interface.

46. A memory hub, comprising:
a first interface for receiving packets or packet fragments having associated flow Ids;
a second interface for outputting the packets or packet fragments;
a controller that queues the packets or packet fragments in a memory according to the associated flow Ids and dequeues the packets from the memory according to the associated flow Ids;
wherein the first interface receives the packets or packet fragments from a switch fabric and the second interface outputs packets to an egress packet processor; and
a traffic manager that receives packet lengths associated with the packets output from the egress packet processor.

47. A memory hub, comprising:
a first interface for receiving packets or packet fragments having associated flow Ids;
a second interface for outputting the packets or packet fragments;
a controller that queues the packets or packet fragments in a memory according to the associated flow Ids and dequeues the packets from the memory according to the associated flow Ids;
wherein the first interface receives the packets or packet fragments from a switch fabric and the second interface outputs packets to an egress packet processor; and
a traffic manager that receives packet lengths associated with the packets received from the first interface.

48. A memory hub, comprising:
a first interface for receiving packets or packet fragments having associated flow Ids;
a second interface for outputting the packets or packet fragments to an egress packet processor for updating packet headers of the packets or packet fragments;
a controller that queues the packets or packet fragments in a memory according to the associated flow Ids and dequeues the packets from the memory according to the associated flow Ids; and
a third interface configured to receive the packets with updated packet headers back from the egress packet processor and a fourth interface for outputting the updated packets to an egress interface circuit.

49. A memory hub according to claim 48 where the egress packet processor outputs the updated packets to the egress interface circuit.

50. A memory hub according to claim 48 where the egress packet processor outputs the updated packets to another memory hub that outputs the updated packets to the egress interface circuit.

51. A memory hub, comprising:
a first interface for receiving packets or packet fragments having associated flow Ids;
a second interface for outputting the packets or packet fragments;
a controller that queues the packets or packet fragments in a memory according to the associated flow Ids and dequeues the packets from the memory according to the associated flow Ids,
wherein the packets or packet fragments include a Class of Service value; or a forwarding label value.

52. A memory hub, comprising:
a first interface for receiving packets or packet fragments having associated flow Ids;
a second interface for outputting the packets or packet fragments;
a controller that queues the packets or packet fragments in a memory according to the associated flow Ids and dequeues the packets from the memory according to the associated flow Ids; and
a data structure that includes an egress flow Id value, a Class of Service value, and a forwarding label value.

53. A memory hub, comprising:
a first interface for receiving packets or packet fragments having associated flow Ids;
a second interface for outputting the packets or packet fragments;
a controller that queues the packets or packet fragments in a memory according to the associated flow Ids and dequeues the packets from the memory according to the associated flow Ids;
wherein the controller tracks packet size information for the flow Ids and queues the packets for outputting to destination ports according to the tracked packet size information.

* * * * *